(12) United States Patent
Ruane et al.

(10) Patent No.: US 12,468,819 B2
(45) Date of Patent: Nov. 11, 2025

(54) DETECTING INFORMATION MODIFICATION IN A MEMORY SYSTEM

(71) Applicant: Micron Technology, Inc., Boise, ID (US)

(72) Inventors: James Ruane, San Jose, CA (US); Jeffrey Lee Munsil, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 271 days.

(21) Appl. No.: 17/850,606

(22) Filed: Jun. 27, 2022

(65) Prior Publication Data

US 2023/0418954 A1    Dec. 28, 2023

(51) Int. Cl.
*G06F 21/60* (2013.01)
*G06F 21/56* (2013.01)

(52) U.S. Cl.
CPC .......... *G06F 21/602* (2013.01); *G06F 21/568* (2013.01)

(58) Field of Classification Search
CPC ...... G06F 21/602; G06F 21/568; G06F 21/64; G06F 21/554; G06F 21/76; G06F 21/79; H04L 9/3236; H04L 9/3242
See application file for complete search history.

(56) References Cited

U.S. PATENT DOCUMENTS

| | | | | | |
|---|---|---|---|---|---|
| 6,138,254 | A * | 10/2000 | Voshell | .................. | G11C 29/44 710/68 |
| 7,328,349 | B2 * | 2/2008 | Milliken | ............... | H04L 51/212 713/160 |
| 7,373,519 | B1 * | 5/2008 | Nachenberg | ............ | G06F 21/57 380/46 |
| 7,594,124 | B2 * | 9/2009 | Durham | .................. | G06F 21/64 713/181 |
| 7,945,787 | B2 * | 5/2011 | Gassoway | ............. | H04L 63/145 713/188 |
| 8,230,510 | B1 * | 7/2012 | Yang | ...................... | G06F 21/564 726/25 |
| 8,356,178 | B2 * | 1/2013 | Hars | ...................... | G06F 21/80 713/168 |
| 8,627,097 | B2 * | 1/2014 | Wolf | ...................... | G06F 21/51 707/698 |
| 9,292,689 | B1 * | 3/2016 | Chuo | .................... | H04L 63/145 |
| 9,495,194 | B1 * | 11/2016 | Twitchell, Jr. | .......... | G06F 3/067 |
| 10,027,689 | B1 * | 7/2018 | Rathor | ............... | H04L 63/1416 |
| 10,637,647 | B2 * | 4/2020 | Temple | .................. | H04L 9/004 |
| 10,666,618 | B2 * | 5/2020 | Boutnaru | ............ | H04L 63/1408 |
| 11,057,421 | B2 * | 7/2021 | Sifford | .................... | G06F 16/22 |
| 11,070,567 | B2 * | 7/2021 | Niemelä | ............... | H04L 63/145 |
| 11,386,234 | B2 * | 7/2022 | Margalit | ................. | G06F 21/64 |

(Continued)

*Primary Examiner* — David Garcia Cervetti
(74) *Attorney, Agent, or Firm* — Holland & Hart LLP (57) ABSTRACT

Methods, systems, and devices for detecting information modification in a memory system are described. A system may generate a first value, such as a first hash value, from information stored in storage component. The system may then generate a second value, such as a second hash value, from content stored in the storage component. After generating the second value, the system may compare the second value to the first value. The system may then determine the modification status of the information based on the comparison, and implement one or more operations based on the modification status.

23 Claims, 5 Drawing Sheets

(56) References Cited

U.S. PATENT DOCUMENTS

| | | | | |
|---|---|---|---|---|
| 11,461,235 B2* | 10/2022 | Hesse | | G06F 21/602 |
| 11,695,793 B2* | 7/2023 | Ng | | H04L 9/3242 |
| | | | | 726/25 |
| 11,868,615 B2* | 1/2024 | Fukazawa | | H03M 7/3088 |
| 12,105,851 B2* | 10/2024 | Ghosh | | G06F 21/552 |
| 12,229,260 B1* | 2/2025 | Villegas | | G06F 21/64 |
| 2003/0115485 A1* | 6/2003 | Milliken | | H04L 51/212 |
| | | | | 726/24 |
| 2003/0126400 A1* | 7/2003 | Debiez | | H04L 9/3236 |
| | | | | 711/216 |
| 2004/0019764 A1* | 1/2004 | Steiss | | G06F 9/3834 |
| | | | | 712/E9.046 |
| 2005/0071640 A1* | 3/2005 | Sprunk | | H04L 9/14 |
| | | | | 713/176 |
| 2005/0132184 A1* | 6/2005 | Palliyil | | H04L 63/1416 |
| | | | | 713/152 |
| 2005/0283566 A1* | 12/2005 | Callaghan | | G06F 21/85 |
| | | | | 711/163 |
| 2006/0036853 A1* | 2/2006 | Chen | | G06Q 20/3674 |
| | | | | 713/161 |
| 2006/0184764 A1* | 8/2006 | Osaki | | G06F 21/64 |
| | | | | 711/216 |
| 2007/0289015 A1* | 12/2007 | Repasi | | G06F 21/56 |
| | | | | 726/22 |
| 2008/0126779 A1* | 5/2008 | Smith | | G06F 21/575 |
| | | | | 713/2 |
| 2009/0158435 A1* | 6/2009 | Milliken | | H04L 63/145 |
| | | | | 726/13 |
| 2011/0202776 A1* | 8/2011 | Chen | | H04L 9/3236 |
| | | | | 713/193 |
| 2011/0295816 A1* | 12/2011 | Sasano | | G06F 21/121 |
| | | | | 707/690 |
| 2013/0124843 A1* | 5/2013 | Bobzin | | G06F 21/575 |
| | | | | 713/2 |
| 2014/0115323 A1* | 4/2014 | Fanton | | H04L 9/32 |
| | | | | 713/155 |
| 2016/0224475 A1* | 8/2016 | Horovitz | | G06F 12/1408 |
| 2016/0365978 A1* | 12/2016 | Ganesan | | G06F 16/2255 |
| 2017/0177269 A1* | 6/2017 | Beard | | G06F 3/0683 |
| 2017/0235970 A1* | 8/2017 | Conner | | G06F 21/44 |
| | | | | 707/690 |
| 2017/0302441 A1* | 10/2017 | Temple | | G06F 21/64 |
| 2018/0074722 A1* | 3/2018 | Iwai | | G06F 21/00 |
| 2018/0096149 A1* | 4/2018 | Morkovský | | G06F 11/302 |
| 2018/0329907 A1* | 11/2018 | De Paris | | G06F 16/2379 |
| 2019/0102541 A1* | 4/2019 | Jo | | G06F 11/3636 |
| 2019/0130126 A1* | 5/2019 | Kataoka | | G06F 40/123 |
| 2019/0141071 A1* | 5/2019 | Heilig | | H04L 63/1425 |
| 2019/0188331 A1* | 6/2019 | Lee | | G06F 12/1018 |
| 2019/0205429 A1* | 7/2019 | Lee | | G06F 16/214 |
| 2019/0266267 A1* | 8/2019 | Ma | | G06F 16/2255 |
| 2019/0294464 A1* | 9/2019 | Twitchell, Jr. | | H04L 67/1097 |
| 2019/0354627 A1* | 11/2019 | Rostagni | | G06F 16/273 |
| 2019/0369979 A1* | 12/2019 | Woods | | G06F 16/137 |
| 2020/0019704 A1* | 1/2020 | Tora | | G06F 21/567 |
| 2020/0097585 A1* | 3/2020 | Laskawiec | | G06F 16/2255 |
| 2020/0110684 A1* | 4/2020 | Hu | | H04L 9/0643 |
| 2020/0159696 A1* | 5/2020 | Adluri | | H04L 67/1097 |
| 2020/0201788 A1* | 6/2020 | Bissey | | G06F 3/0659 |
| 2020/0272612 A1* | 8/2020 | Velur | | G06F 16/248 |
| 2020/0310776 A1* | 10/2020 | Troia | | H04L 9/3236 |
| 2020/0311270 A1* | 10/2020 | Gryaznov | | G06F 21/561 |
| 2020/0313851 A1* | 10/2020 | Mondello | | H04L 9/3247 |
| 2020/0372183 A1* | 11/2020 | Rangaiah | | G06F 21/57 |
| 2021/0019418 A1* | 1/2021 | Peeters | | H04L 9/3242 |
| 2021/0109900 A1* | 4/2021 | McIlroy | | G06F 16/1752 |
| 2021/0211272 A1* | 7/2021 | Miyamae | | G06F 21/64 |
| 2021/0226801 A1* | 7/2021 | Kojima | | H04L 9/0643 |
| 2021/0286877 A1* | 9/2021 | Vijayvargiya | | G06F 9/45558 |
| 2021/0344497 A1* | 11/2021 | Wright | | H04L 9/0643 |
| 2022/0004644 A1* | 1/2022 | Albero | | G06F 21/6218 |
| 2022/0058281 A1* | 2/2022 | Gryting | | G06F 3/065 |
| 2022/0058295 A1* | 2/2022 | Boehm | | H04L 9/3242 |
| 2022/0171536 A1* | 6/2022 | Watson | | G06F 3/065 |
| 2022/0357963 A1* | 11/2022 | Pradhan | | G06F 3/04842 |
| 2022/0377109 A1* | 11/2022 | Kallos | | H04L 9/3236 |
| 2023/0004642 A1* | 1/2023 | Kongara | | G06F 21/568 |
| 2023/0004649 A1* | 1/2023 | Su | | G06F 11/1469 |
| 2023/0153436 A1* | 5/2023 | Seletskiy | | G06F 21/566 |
| | | | | 726/1 |
| 2024/0073224 A1* | 2/2024 | Seletskiy | | H04L 63/1416 |
| 2024/0111553 A1* | 4/2024 | Pradhan | | G06F 3/04817 |
| 2024/0323353 A1* | 9/2024 | Zhang | | H04N 19/52 |

* cited by examiner

//www.w3.org/1999/xhtml">
DETECTING INFORMATION MODIFICATION IN A MEMORY SYSTEM

FIELD OF TECHNOLOGY

The following relates to one or more systems for memory, including detecting information modification in a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

A system (e.g., an application-specific integrated circuit (ASIC)), may include a variety of processors that perform processing operations and a variety of storage components, such as memories and registers, that store information such as dynamic information (e.g., that is modified as the system operates). In addition to storing the dynamic information, the system may also store static information that remains unmodified (or is configured to remain unmodified) as the system operates. For example, the system may store instruction code for the processors of the system and that instruction code may be protected from modification and designed to remain static during operation. Nevertheless, in some cases, the static information stored by a system may inadvertently become modified (e.g., due external attacks, operational errors), which may negatively impact system security or performance, among other disadvantages.

According to the techniques described herein, a system may improve security and performance, among other benefits, by generating (e.g., at initialization) hash values for sets of information (e.g., static information). To detect whether a set of information, such as static information, has been modified during operation of the system, the system may generate (e.g., intermittently generate) an updated hash value for the set of information for comparison against the initial hash value for that set of information. If the updated hash value is the same as (e.g., equal to) the initial hash value, the system may determine that the set of information is unmodified and may proceed with planned (e.g., normal) operations. However, if the updated hash value is different than the initial hash value, the system may determine that the set of information is modified and may initiate one or more remedial operations.

Features of the disclosure are initially described in the context of systems and subsystems as described with reference to FIGS. 1 and 2. Features of the disclosure are described in the context of a process flow as described with reference to FIG. 3. These and other features of the disclosure are further illustrated by and described with reference to an apparatus diagram and flowcharts that relate to detecting information modification in a memory system as described with reference to FIGS. 4 and 5.

Figure 1:
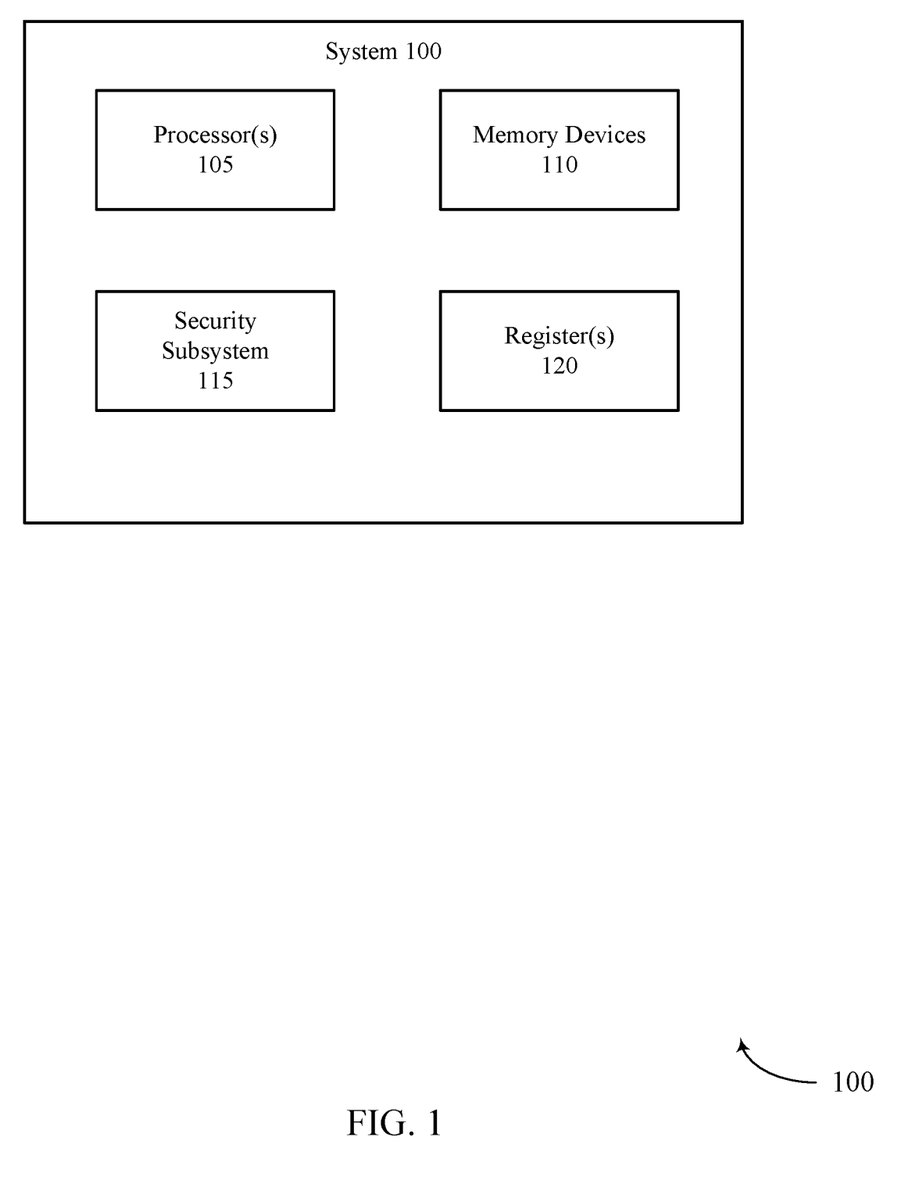
FIG. 1 illustrates an example of a system that supports detecting information modification in a memory system in accordance with examples as disclosed herein.

FIG. 1 illustrates an example of a system 100 that supports detecting information modification in a memory system in accordance with examples as disclosed herein. In some examples, the system 100 may be an ASIC that is part of an electronic device, such as a computing device, a mobile computing device, a wireless device, a graphics processing device, a vehicle, or other systems. For example, the system 100 may be part of a computer, a laptop computer, a tablet computer, a smartphone, a cellular phone, a wearable device, an internet-connected device, a vehicle controller, or the like. Thus, the system 100 may be coupled with a host device.

The system 100 may include one or more processor(s) 105, which may be configured to perform various processing operations using data from, among other sources, the memory device(s) 110. The processor(s) 105 may be configured to execute instruction code (e.g., firmware) that is stored by one or more of the memory device(s) 110. The processors 105 may be general-purpose processors, digital signal processors (DSPs), ASICs, field-programmable gate arrays (FPGAs) or other programmable logic devices, discrete gates or transistor logic, discrete hardware components, or a combination of these components.

A memory device 110 may be configured to store data (e.g., dynamic information, static information) for the system 100. Accordingly, a memory device 110 may respond to and execute access commands (e.g., read commands, write commands) received from other components of the system 100, such as the security subsystem 115. The memory device(s) 110 may include different types of memory arrays, such as SRAM, flash memory, DRAM, etc. The memory device(s) 110 may be distributed across the die of the system 100 and different memory devices may be coupled with different processors. However, some or all of the memory device(s) 110 may be accessible by the security subsystem 115, which may allow the security subsystem 115 to monitor the memory arrays of the memory devices for attacks and errors. Although shown internal to the system 100, one or more of the memory device(s) 110 may be external to the system 100 yet accessible to the system 100 via one or more interfaces or controllers.

In some examples, the system 100 may include various peripheral components. The peripheral components may be any input device or output device, or an interface for such devices, that may be integrated into or with the system 100. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 may include an I/O controller. An I/O controller may manage data communication between the processor 105 and the peripheral component(s) (e.g., input devices, output devices). The I/O controller may manage peripherals that are not integrated into or with the system 100. In some examples, the I/O controller may represent a physical connection (e.g., one or more ports) with external peripheral components.

In some examples, the system 100 may include an input component, an output component, or both. An input component may represent a device or signal external to the system 100 that provides information (e.g., signals, data) to the system 100 or its components. In some examples, and input component may include an interface (e.g., a user interface or an interface between other devices). In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

A memory device 110 may include a device memory controller configured to control operation of the memory device 110 and one or more memory arrays for data storage. The memory device(s) 110 may be configured to store data for the system 100 or a host device coupled with the system 100. Additionally, some of the memory device(s) 110 may be configured to store static information that is protected from modification, or is expected to remain unmodified, during operation of the system 100. For example, one or more of the memory devices 110 may be configured to store instruction code for the processors 105 or other components of the system 100. The instruction code may control the operations of the processor(s) 105. Upon initialization of the system 100, the instruction code for a processor 105 may be read from the memory device 110 that stores the instruction code and may be provided to the processor 105 for execution.

The components of the system 100 may exchange information with other components of the system 100 using one or more channels. Each channel may be an example of a transmission medium that carries information between components. Each channel may include one or more signal paths (e.g., a transmission medium, a conductor) between terminals associated with the components of the system 100. A signal path may be an example of a conductive path operable to carry a signal. For example, a channel may be associated with a first terminal (e.g., including one or more pins, including one or more pads) at a first component and a second terminal at a second component. A terminal may be an example of a conductive input or output point of a device of the system 100, and a terminal may be operable to act as part of a channel.

Channels (and associated signal paths and terminals) may be dedicated to communicating one or more types of information. For example, the channels may include one or more command and address (CA) channels, one or more clock signal channels, one or more data channels, one or more other channels, or a combination thereof. In some examples, signaling may be communicated over the channels using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

The security subsystem 115 may be configured to monitor the system 100 for, among other aspects, security breaches or functional safety issues. For example, the security subsystem 115 may be configured to detect malicious attacks by an external actor and initiate one or more remedial actions in response to detecting the attacks. In some examples, the security subsystem 115 be subject to heightened security measures relative to other components of the system 100. For example, the instruction code for the security subsystem 115 may be stored in a local memory array of the security subsystem 115 (as opposed to the memory devices 110), and the security subsystem 115 may perform various verification and validation procedures on the instruction code before executing the instruction code.

As noted, various storage components of the system 100 (e.g., the memory device(s) 110, the register(s) 120) may be configured to store static information, such as instruction code for the processor(s) 105. The static information may be protected from modification and expected to remain unmodified during operation of the system 100. Nevertheless, in some examples the static information may be modified, where modification refers to a change in one or more bits. For instance, a malicious external entity may infiltrate the system 100 and cause the static information to be modified in a manner that exposes private information (e.g., via unauthorized data transfers) or damages the system 100. Alternatively, the system 100 may inadvertently modify the static information due to one or more operating errors. Thus, undetected modifications to static information may compromise the security of the system 100, negatively impact the operation of the system 100 (including functional safety aspects), or both, among other negative consequences.

To detect modification of static information that is stored in a storage component (e.g., a memory device 110, a register 120), the system 100 may (e.g., via the security subsystem 115) compare two pieces of information, such as hash values, generated from content of the storage component that is read at different times. For instance, the system 100 may compare A) a first hash value generated from static information initially stored in the storage component and B)

a second hash value generated from the content of the storage component after some time has elapsed. If the two hash values match, the system 100 may determine that the static information is unmodified in the storage component and proceed with planned operations. If the two hash values are different, the system 100 may determine that the static information is modified in the storage component and may initiate one or more remedial operations.

Although described with reference to static information, the techniques described herein can be used to detect the modification of other types of information, such as dynamic information.

Figure 2:
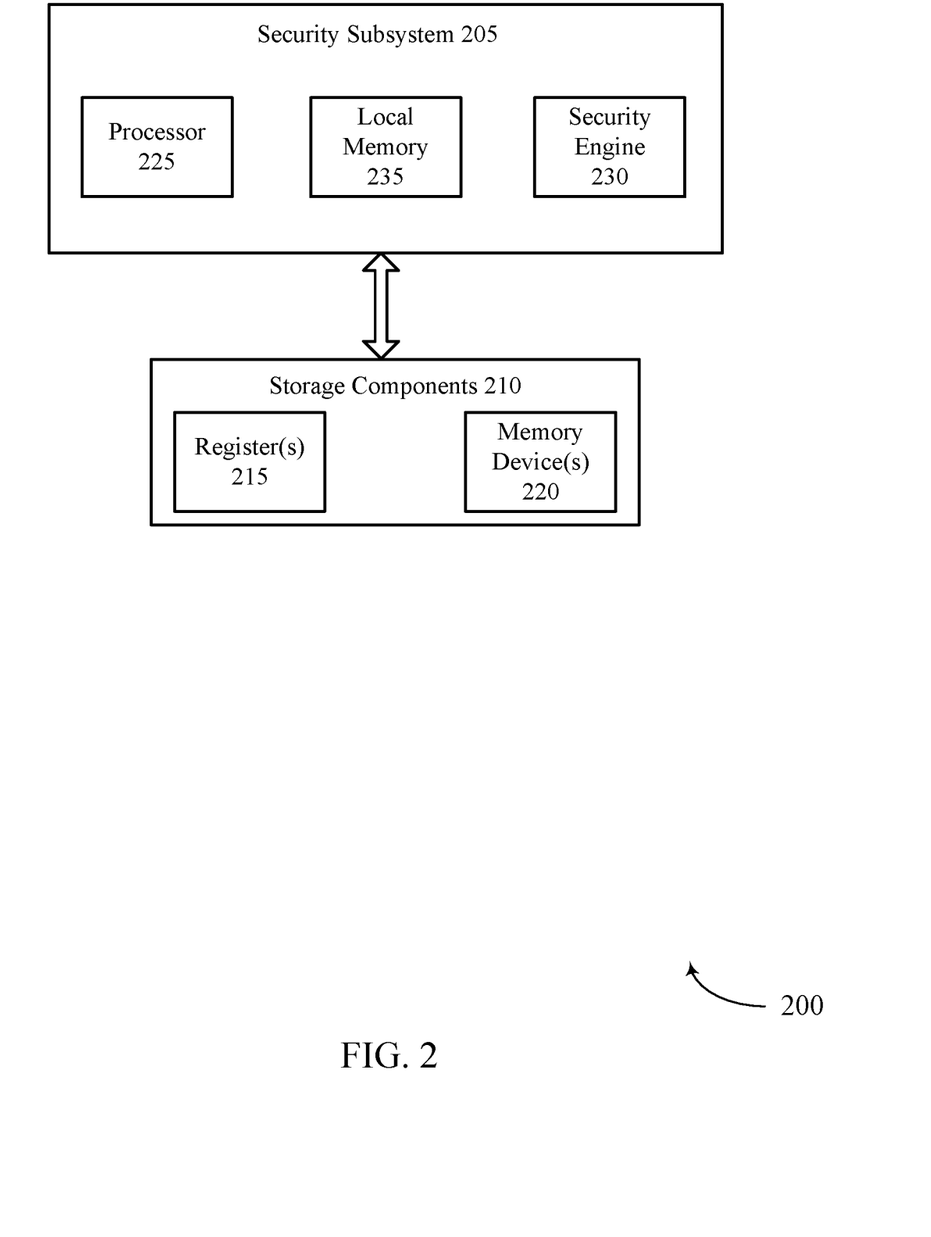
FIG. 2 illustrates an example of a system that supports detecting information modification in a memory system in accordance with examples as disclosed herein.

FIG. 2 illustrates an example of a system 200 that supports detecting information modification in a memory system in accordance with examples as disclosed herein. The system 200 may be an example of the system 100 described with reference to FIG. 1. The system 200 may include a security subsystem 205 and storage components 210, which may include one or more registers 215, one or more memory device(s) 220, or both, among other types of storage components. The security subsystem 205 may be an example of a security subsystem 115 as described with reference to FIG. 1. The security subsystem 205 may implement the techniques described herein to detect modifications to static information stored in the storage component(s) 210.

The security subsystem 205 may include a processor 225 that is configured to perform various security processing operations for the security subsystem 205. The processor 225 may execute instruction code from a memory, such as the local memory 235 or a closely-coupled memory, which may improve the security of the instruction code. The processor 225 may communicate with and control various components of the security subsystem 205, including the security engine 230 and the local memory 235.

In some cases, the system 200 may be exposed to a malicious external entity that attempts to damage or control the system 200 by causing the system 200 to modify information (e.g., static information) that is configured or expected to remain unmodified (e.g., to remain fixed, to remain the same). If successful, the modified information may cause the system 200 to take deleterious or unauthorized actions such as exposing private information (e.g., by initiating an unauthorized data transfer) or disabling important functionality. In other cases, the system 200 may inadvertently modify static information in a manner that negatively impacts functional safety. For example, if the system 200 is part of a self-driving vehicle, modification of static information may cause the self-driving vehicle to malfunction or operate in a dangerous manner. So, modifications to static information may result in security and performance (e.g., safety) issues, among other negative consequences.

The security engine 230 may be configured to detect modification of static information stored in the storage components 210. In some examples, the security engine 230 may include circuitry or logic (e.g., a direct memory access (DMA) engine) that is configured to access the storage components 210. To detect the modification status for a set of static information that is stored in a storage component 210, the security engine 230 may first generate a hash value (which may also be referred to as a signature or other suitable terminology) from the unmodified set of static information, which may be read from one of the storage components 210. To generate a hash value, the security engine 230 may use a hash function (which may also be referred to as a hash algorithm or hash code) that maps data of arbitrary sizes to values (e.g., fixed-size values), referred to as hash values. Given the same input data, a hash function outputs the same hash value. So, differences between hash values indicate differences between input data.

After generating the hash value for the unmodified set of static information, referred to as the "initial hash value," the security engine 230 may store the initial hash value in the local memory 235, which may be configured for storing hash values. Later (e.g., after a threshold duration as expired), the security engine 230 may retrieve the initial hash value and use the initial hash value to determine the modification status of the set of static information. For instance, the security engine 230 may compare the initial hash value with a second hash value that is generated (using the same hash function) from content stored in the storage component 210 that stored the set of static information. The content may be read from the same memory cells or registers that stored the set of static information and thus may be either the set of static information (unmodified) or other information (e.g., a modified version of the set of static information, which may include some or none of the initial set of static information).

If the second hash value is the same as (e.g., equal to) the initial hash value, the security engine 230 may determine that the set of static information has not been modified and may refrain from initiating any remedial operations associated with modified static information.

If the second hash value is different than (e.g., not equal to) the initial hash value, the security engine 230 may determine that the set of static information has been modified and may initiate one or more remedial operations associated with modified static information. For example, the security engine 230 may cause the security subsystem 205 or the system 200 to transmit (e.g., to a host device) an alert signal indicating that the set of static information has been modified. Additionally or alternatively, the security engine 230 may cause the security subsystem 205 or the system 200 to halt or prevent (e.g., deny) a data transfer (e.g., between the system 200 and an external system). Additionally or alternatively, the security engine 230 may cause the system 200 to reset (e.g., initiate a restart procedure).

Although described with reference to a single set of static information, the techniques described herein may be implemented for multiple sets of static information. In some examples, hash values may be generated per set of static information. For instance, if the memory device(s) 220 store x sets of static information (e.g., x sets of instruction code for x processors of the system 200), the security engine 230 may generate x hash values (one per set of static information). Alternatively, a hash value may be generated for multiple sets of static information. For instance, the security engine 230 may generate a hash value from (e.g., based on) a first set of static information (e.g., instruction code for a first processor, operating information from a first register 215) and a second set of static information (e.g., instruction code for a second processor, operating information from a second register 215).

Thus, the system 200 may detect and respond to modifications of information (e.g., static information) stored in the storage components 210 of the system 200, which may improve the security, performance, or both, of the system 200. Although described with reference to static information, the modification detection techniques described herein can be applied to any type of information.

Figure 3:
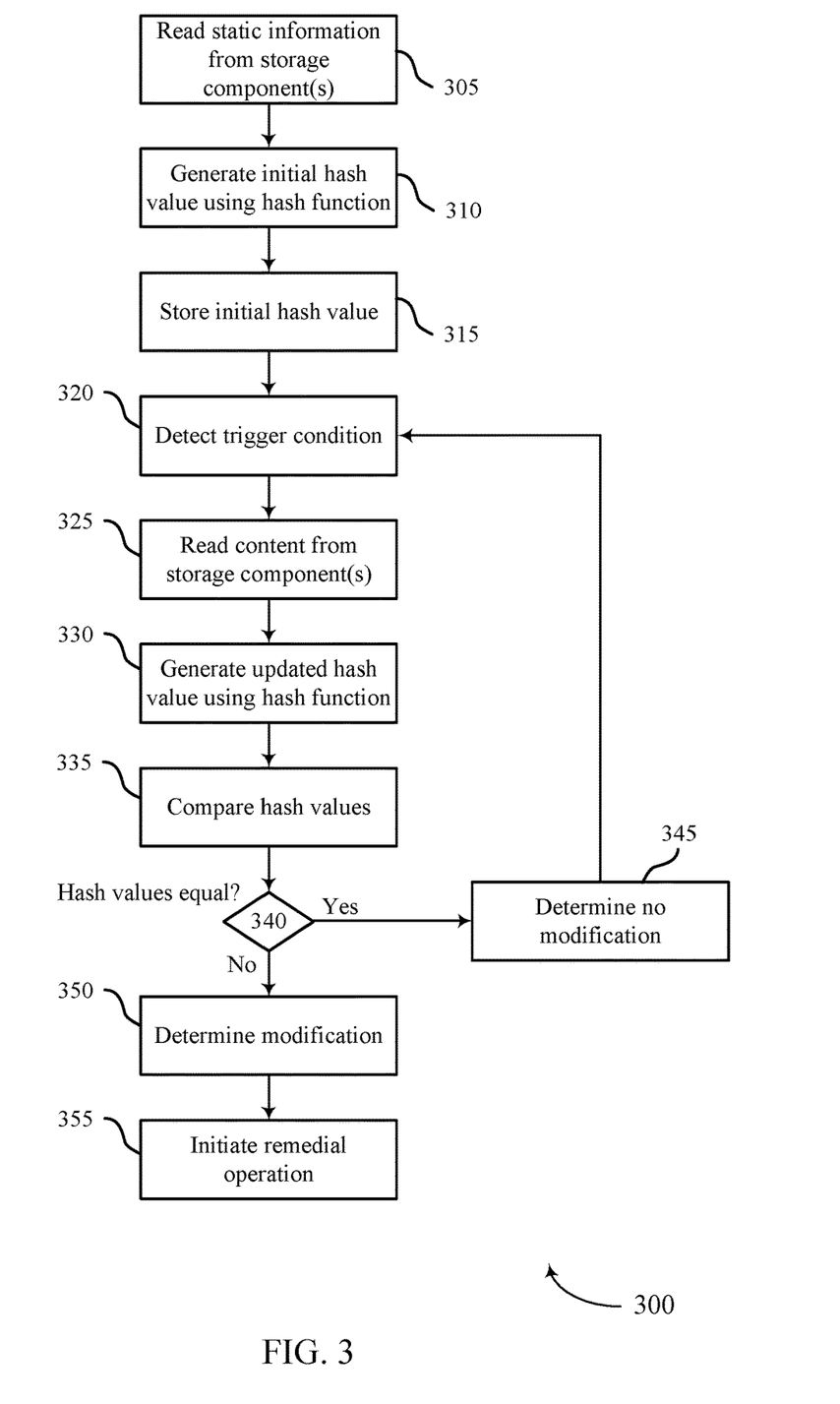
FIG. 3 illustrates an example of a process flow that supports detecting information modification in a memory system in accordance with examples as disclosed herein.

FIG. 3 illustrates an example of a process flow 300 that supports detecting information modification in a memory system in accordance with examples as disclosed herein. The process flow 300 may be implemented by a system such as the system 100 or the system 200 as with reference to FIGS. 1 and 2, respectively. Implementation of the process flow 300 may allow the system to detect modifications to information (e.g., static information) that, if undetected, may negatively impact the security or performance of the system.

At 305, the system may read information (e.g., static information) from one or more storage components. For example, the system may read static information from one or more memory arrays or one or more registers of the system (or some combination). In some examples, static information from a memory array may include instruction code for a processor of the system. In some examples, static information from the register may include operating information for the system. The static information may include static information from one storage location or from multiple storage locations. For instance, the static information may include first static information from a first storage component and second static information from a second storage component. In such a scenario, reading the static information at 305 may include reading the first static information from the first storage component and reading the second static information from the second storage component.

At 310, the system may (e.g., via the security engine 230 of the security subsystem 205) generate an initial hash value from the static information by using a hash function. For example, the system may apply the hash function to the static information so that the initial hash value is computed. At 315, after generating the initial hash value, the system may store (e.g., in the local memory 235) the initial hash value for later use.

At 320, the system may detect a trigger condition for determining the modification status of the static information. In some examples, the trigger condition may be the expiration of a timer. In some examples, the timer may be configured to expire periodically.

At 325, the system may read content from the one or more storage components from which the static information was read at 305. The system may read the content based on (e.g., in response to) detection of the trigger condition at 325. If the static information at 305 was read from a single storage component, the system may read the content from that storage component. If the static information at 305 was read from multiple storage components (e.g., a first storage component and a second storage component), the system may read the content from those storage components. For example, the system may read first content from the first storage component and second content from the second storage component. The content read at 325 may be read from the same portions of the storage components as the static information read at 305. For example, if the static information read at 305 is read from a set of memory cells, the content read at 325 may be read from the same set of memory cells.

At 330, the system may generate an updated hash value from the content read at 325 by using the hash function. For example, the system may apply the hash function used 310 to the content so that the updated hash value is computed.

At 335, the system may compare the hash values generated at 310 and 330. For example, the system may compare the initial hash value (generated from the static information) to the updated hash value (generated from the content). At 340, the system may determine the modification status of the static information by determining whether the hash values are equal. If the system determines that the updated hash value and the initial hash value are equal, the system may determine at 345 that the static information has not been modified. Accordingly, the system may refrain from initiating any remedial operations associated with modified static information. If a data transfer is requested or in progress, the system may permit the data transfer to continue or to occur based on determining that the static information has not been modified. If the system determines that the updated hash value and the initial hash value are not equal, the system may determine at 350 that the static information has been modified.

At 355, the system may initiate one or more remedial operations based on (e.g., in response to) determining that the static information has been modified. For example, the system may transmit (e.g., to a host device) an alert signal indicating that the set of static information has been modified. Additionally or alternatively, the system may halt an in-progress data transfer (e.g., between the system and an external system) or prevent an upcoming data transfer from occurring. Additionally or alternatively, the system may initiate a restart procedure in an attempt to reset the system. Other remedial operations are contemplated and within the scope of the present disclosure.

If the system determines no modification at 345, the system may continue to monitor the static information for modification. For example, the system may return to 320 and detect a trigger condition for determining the modification status of the static information. At 330, the system may read second content from the one or more storage components from which the static information was read at 305. The system may read the second content based on (e.g., in response to) detection of the trigger condition.

At 330, the system may generate a second updated hash value from the second content read at 325 using a hash function. At 335, the system may compare the hash values generated at 305 and 330. For example, the system may compare the initial hash value (generated from the static information) to the second updated hash value (generated from the second content). At 340, the system may determine the modification status of the static information by determining whether the hash values are equal. If the system determines that the second updated hash value and the initial hash value are equal, the system may determine at 345 that the static information remains unmodified and, accordingly, refrain from initiating any remedial operations. If the system determines that the second updated hash value and the initial hash value are not equal, the system may determine at 350 that the static information has been modified and, accordingly, initiate one or more remedial operations at 355.

Thus, the system may detect modifications to static information that, if undetected, may negatively impact the security or performance of the system.

Figure 4:
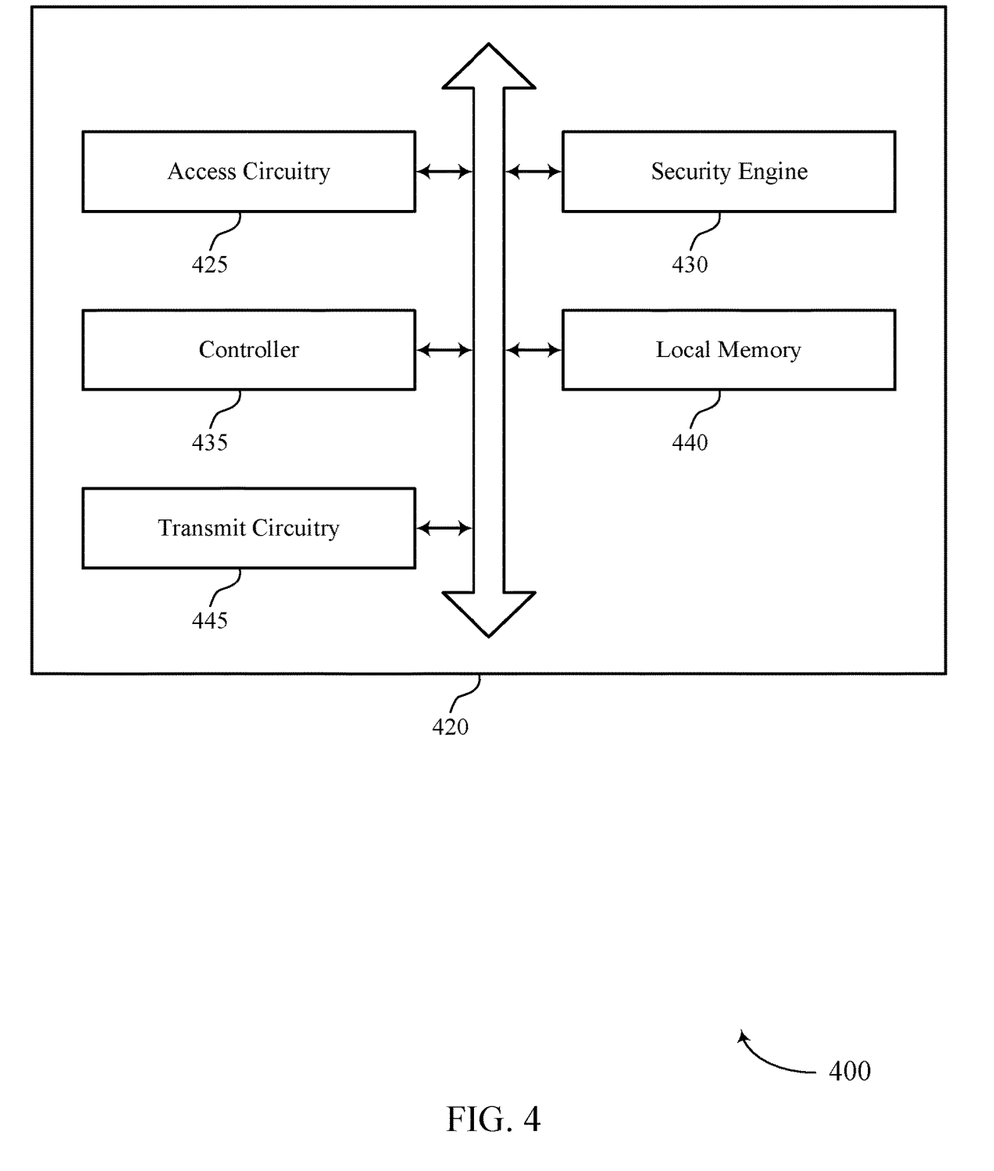
FIG. 4 shows a block diagram of a system that supports detecting information modification in a memory system in accordance with examples as disclosed herein.

FIG. 4 shows a block diagram 400 of a system 420 that supports detecting information modification in a memory system in accordance with examples as disclosed herein. The system 420 may be an example of aspects of a system as described with reference to FIGS. 1 through 3. The system 420, or various components thereof, may be an example of means for performing various aspects of detecting information modification in a memory system as described herein. For example, the system 420 may include an access circuitry 425, a security engine 430, a controller 435, a local memory 440, a transmit circuitry 445, or any combination thereof. Each of these components may communicate, directly or indirectly, with one another (e.g., via one or more buses).

The access circuitry 425 may be configured as or otherwise support a means for reading, at a system, content from a storage component, the storage component to store a set of information that is to remain unmodified during operation of the system. The security engine 430 may be configured as or otherwise support a means for generating a first hash value from the content using a hash function. In some examples, the access circuitry 425 may be configured as or otherwise support a means for comparing the first hash value with a second hash value for the set of information that is based on the hash function. The controller 435 may be configured as or otherwise support a means for determining a modification status of the set of information based on comparing the first hash value with the second hash value.

In some examples, to support determining the modification status, the controller 435 may be configured as or otherwise support a means for determining that the set of information has been modified, the method further including. In some examples, to support determining the modification status, the controller 435 may be configured as or otherwise support a means for performing an operation based on determining that the set of information has been modified.

In some examples, to support performing the operation, the transmit circuitry 445 may be configured as or otherwise support a means for transmitting an indication that the set of information has been modified, initiating a restart procedure, halting a data transfer, preventing a data transfer, or any combination thereof.

In some examples, the controller 435 may be configured as or otherwise support a means for determining that the first hash value and the second hash value are different, where determining the modification status includes. In some examples, the controller 435 may be configured as or otherwise support a means for determining that the set of information has been modified.

In some examples, the controller 435 may be configured as or otherwise support a means for transmitting an indication that the set of information has been modified, initiating a restart procedure, halting a data transfer, preventing a data transfer, or any combination thereof, based on determining that the set of information has been modified.

In some examples, the controller 435 may be configured as or otherwise support a means for determining that the first hash value and the second hash value are equal, where determining the modification status includes. In some examples, the controller 435 may be configured as or otherwise support a means for determining that the set of information has not been modified.

In some examples, the controller 435 may be configured as or otherwise support a means for permitting a data transfer to occur based on determining that the set of information has not been modified.

In some examples, the security engine 430 may be configured as or otherwise support a means for generating, using the hash function, a third hash value from second content stored in the storage component. In some examples, the controller 435 may be configured as or otherwise support a means for determining, based on the third hash value being different than the second hash value, that the set of information has been modified since determination of the modification status.

In some examples, the access circuitry 425 may be configured as or otherwise support a means for reading the set of information from the storage component. In some examples, the security engine 430 may be configured as or otherwise support a means for generating the second hash value using the hash function and based on reading the set of information. In some examples, the local memory 440 may be configured as or otherwise support a means for storing the second hash value before reading the content. In some examples, the content is read from the same set of memory cells as the set of information.

In some examples, the access circuitry 425 may be configured as or otherwise support a means for reading second content from a second storage component, where the second storage component is configured to store a second set of information that is to remain unmodified during operation of the system. In some examples, the security engine 430 may be configured as or otherwise support a means for generating the first hash value from the second content.

In some examples, the storage component includes a memory array of the system. In some examples, the set of information includes instruction code for a processor of the system. In some examples, the storage component includes a register of the system. In some examples, the content includes operating information for the system.

Figure 5:
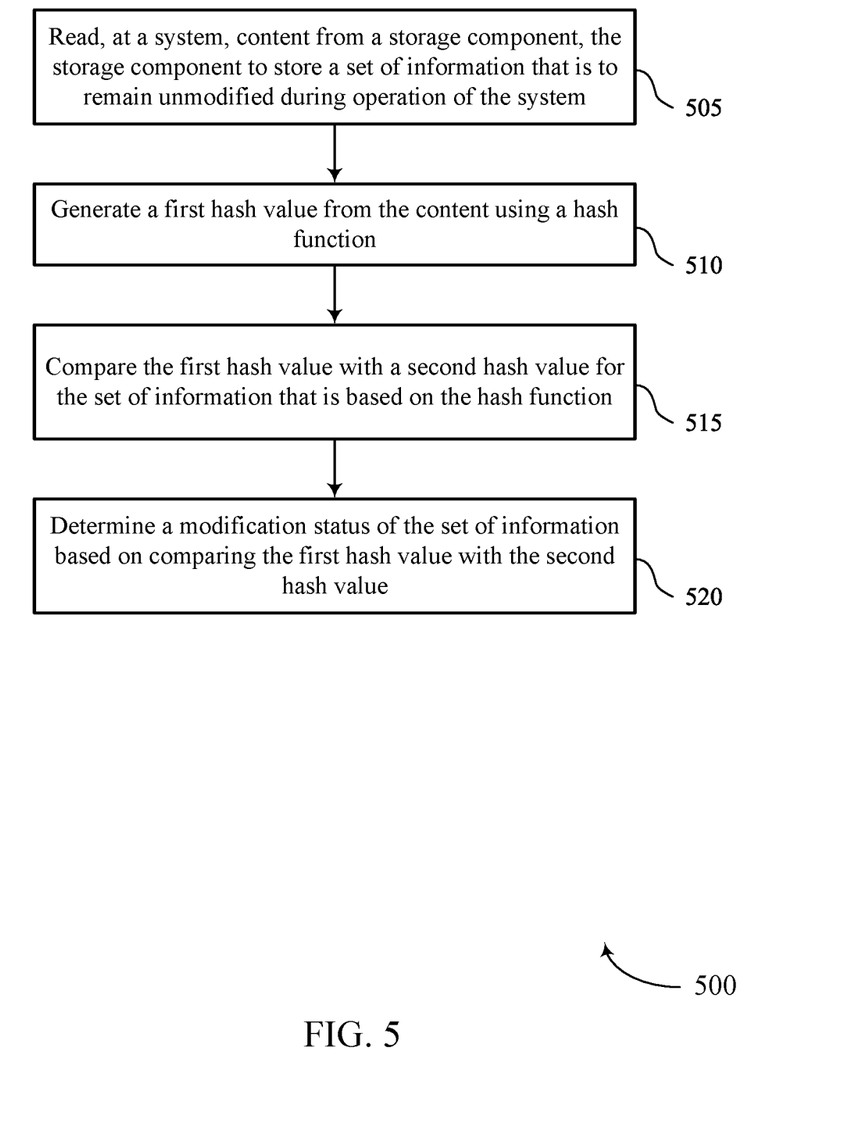
FIG. 5 shows a flowchart illustrating a method or methods that support detecting information modification in a memory system in accordance with examples as disclosed herein.

FIG. 5 shows a flowchart illustrating a method 500 that supports detecting information modification in a memory system in accordance with examples as disclosed herein. The operations of method 500 may be implemented by a system or its components as described herein. For example, the operations of method 500 may be performed by a system as described with reference to FIGS. 1 through 4. In some examples, a system may execute a set of instructions to control the functional elements of the device to perform the described functions. Additionally, or alternatively, the system may perform aspects of the described functions using special-purpose hardware.

At 505, the method may include reading, at a system, content from a storage component, the storage component to store a set of information that is to remain unmodified during operation of the system. The operations of 505 may be performed in accordance with examples as disclosed herein. In some examples, aspects of the operations of 505 may be performed by an access circuitry 425 as described with reference to FIG. 4.

At 510, the method may include generating a first hash value from the content using a hash function. The operations of 510 may be performed in accordance with examples as disclosed herein. In some examples, aspects of the operations of 510 may be performed by a security engine 430 as described with reference to FIG. 4.

At 515, the method may include comparing the first hash value with a second hash value for the set of information that is based on the hash function. The operations of 515 may be performed in accordance with examples as disclosed herein. In some examples, aspects of the operations of 515 may be performed by an access circuitry 425 as described with reference to FIG. 4.

At 520, the method may include determining a modification status of the set of information based on comparing the first hash value with the second hash value. The operations of 520 may be performed in accordance with examples as disclosed herein. In some examples, aspects of the operations of 520 may be performed by a controller 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for reading, at a system, content from a storage component, the storage component to store a set of information that is to remain unmodified during operation of the system; generating a first hash value from the content using a hash function; comparing the first hash value with a second hash value for the set of information that is based on the hash function; and determining a modification status of the set of information based on comparing the first hash value with the second hash value.

Aspect 2: The method, apparatus, or non-transitory computer-readable medium of aspect 1 where determining the modification status includes operations, features, circuitry, logic, means, or instructions, or any combination thereof for determining that the set of information has been modified, the method further including and performing an operation based on determining that the set of information has been modified.

Aspect 3: The method, apparatus, or non-transitory computer-readable medium of aspect 2 where performing the operation includes operations, features, circuitry, logic, means, or instructions, or any combination thereof for transmitting an indication that the set of information has been modified, initiating a restart procedure, halting a data transfer, preventing a data transfer, or any combination thereof Aspect 4: The method, apparatus, or non-transitory computer-readable medium of any of aspects 1 through 3, further including operations, features, circuitry, logic, means, or instructions, or any combination thereof for determining that the first hash value and the second hash value are different, where determining the modification status includes and determining that the set of information has been modified.

Aspect 5: The method, apparatus, or non-transitory computer-readable medium of aspect 4, further including operations, features, circuitry, logic, means, or instructions, or any combination thereof for transmitting an indication that the set of information has been modified, initiating a restart procedure, halting a data transfer, preventing a data transfer, or any combination thereof, based on determining that the set of information has been modified.

Aspect 6: The method, apparatus, or non-transitory computer-readable medium of any of aspects 1 through 5, further including operations, features, circuitry, logic, means, or instructions, or any combination thereof for determining that the first hash value and the second hash value are equal, where determining the modification status includes and determining that the set of information has not been modified.

Aspect 7: The method, apparatus, or non-transitory computer-readable medium of aspect 6, further including operations, features, circuitry, logic, means, or instructions, or any combination thereof for permitting a data transfer to occur based on determining that the set of information has not been modified.

Aspect 8: The method, apparatus, or non-transitory computer-readable medium of any of aspects 6 through 7, further including operations, features, circuitry, logic, means, or instructions, or any combination thereof for generating, using the hash function, a third hash value from second content stored in the storage component and determining, based on the third hash value being different than the second hash value, that the set of information has been modified since determination of the modification status.

Aspect 9: The method, apparatus, or non-transitory computer-readable medium of any of aspects 1 through 8, further including operations, features, circuitry, logic, means, or instructions, or any combination thereof for reading the set of information from the storage component; generating the second hash value using the hash function and based on reading the set of information; and storing the second hash value before reading the content.

Aspect 10: The method, apparatus, or non-transitory computer-readable medium of aspect 9 where the content is read from the same set of memory cells as the set of information.

Aspect 11: The method, apparatus, or non-transitory computer-readable medium of any of aspects 1 through 10, further including operations, features, circuitry, logic, means, or instructions, or any combination thereof for reading second content from a second storage component, where the second storage component is configured to store a second set of information that is to remain unmodified during operation of the system and generating the first hash value from the second content.

Aspect 12: The method, apparatus, or non-transitory computer-readable medium of any of aspects 1 through 11 where the storage component includes a memory array of the system and the set of information includes instruction code for a processor of the system.

Aspect 13: The method, apparatus, or non-transitory computer-readable medium of any of aspects 1 through 12 where the storage component includes a register of the system and the content includes operating information for the system.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
reading, at a system, first content from a first storage component and second content from a second storage component, the first storage component to store a first set of information that is to remain unmodified during operation of the system, and the second storage component to store a second set of information that is to remain unmodified during operation of the system;
generating, using a hash function, a first hash value from the first content read from the first storage component and from the second content read from the second storage component;
comparing the first hash value with a second hash value that is generated using the hash function before generation of the first hash value, wherein the second hash value is generated from the first set of information and the second set of information, based at least in part on reading the first set of information from the first storage component and on reading the second set of information from the second storage component; and
determining a modification status of the first set of information and the second set of information based on comparing the first hash value with the second hash value.

2. The method of claim 1, wherein determining the modification status comprises:
determining that the first set of information or the second set of information has been modified, the method further comprising:
performing an operation based on determining that the first set of information or the second set of information has been modified.

3. The method of claim 2, wherein performing the operation comprises:
transmitting an indication that the first set of information or the second set of information has been modified, initiating a restart procedure, halting a data transfer, preventing a data transfer, or any combination thereof.

4. The method of claim 1, further comprising:
determining that the first hash value and the second hash value are different, wherein determining the modification status comprises:
determining that the first set of information or the second set of information has been modified.

5. The method of claim 4, further comprising:
transmitting an indication that the first set of information or the second set of information has been modified, initiating a restart procedure, halting a data transfer, preventing a data transfer, or any combination thereof, based on determining that the first set of information or the second set of information has been modified.

6. The method of claim 1, further comprising:
determining that the first hash value and the second hash value are equal, wherein determining the modification status comprises:
determining that the first set of information and the second set of information have not been modified.

7. The method of claim 6, further comprising:
permitting a data transfer to occur based on determining that the first set of information and the second set of information have not been modified.

8. The method of claim 6, further comprising:
generating, using the hash function, a third hash value from third content stored in the first storage component; and
determining, based on the third hash value being different than the second hash value, that the first set of information has been modified since determination of the modification status.

9. The method of claim 1, further comprising:
generating the second hash value using the hash function and based on reading the first set of information; and
storing the second hash value before reading the first content.

10. The method of claim 9, wherein the first content is read from a same set of memory cells as the first set of information.

11. The method of claim 1, wherein the first storage component comprises a memory array of the system, and wherein the first set of information comprises instruction code for a processor of the system.

12. The method of claim 1, wherein the first storage component comprises a register of the system, and wherein the first content comprises operating information for the system.

13. A system, comprising:
a first storage component and a second storage component; and
one or more controllers configured to cause the system to:
read first content from the first storage component and second content from a second storage component, the first storage component to store a first set of information that is to remain unmodified during operation of the system, and the second storage component to store a second set of information that is to remain unmodified during operation of the system;
generate, using a hash function, a first hash value from the first content read from the first storage component and from the second content read from the second storage component;
compare the first hash value with a second hash value that is generated using the hash function before generation of the first hash value, wherein the second hash value is generated from the first set of information and the second set of information based at least in part on reading the first set of information from the first storage component and on reading the second set of information from the second storage component; and
determine a modification status of the first set of information and the second set of information based on comparing the first hash value with the second hash value.

14. The system of claim 13, wherein the one or more controllers is configured to cause the system to determine the modification status by being configured to cause the system to:
determine that the first set of information or the second set of information has been modified, and wherein the one or more controllers is further configured to cause the system to:

perform an operation based on determining that the first set of information or the second set of information has been modified.

15. The system of claim 14, wherein the one or more controllers is configured to cause the system to perform the operation by being configured to cause the system to:
transmit an indication that the first set of information or the second set of information has been modified, initiating a restart procedure, halting a data transfer, preventing a data transfer, or any combination thereof.

16. The system of claim 13, wherein the one or more controllers is further configured to cause the system to:
determine that the first hash value and the second hash value are different, wherein the one or more controllers is configured to cause the system to determine the modification status by being configured to cause the system to:
determine that the first set of information or the second set of information has been modified.

17. The system of claim 16, wherein the one or more controllers is further configured to cause the system to:
transmit an indication that the first set of information or the second set of information has been modified, initiating a restart procedure, halting a data transfer, preventing a data transfer, or any combination thereof, based on determining that the first set of information or the second set of information has been modified.

18. The system of claim 13, wherein the one or more controllers is further configured to cause the system to:
determine that the first hash value and the second hash value are equal, wherein the one or more controllers is configured to cause the system to determine the modification status by being configured to cause the system to:
determine that the first set of information and the second set of information have not been modified.

19. The system of claim 18, wherein the one or more controllers is further configured to cause the system to:
permit a data transfer to occur based on determining that the first set of information and the second set of information have not been modified.

20. The system of claim 18, wherein the one or more controllers is further configured to cause the system to:
generate, using the hash function, a third hash value from third content stored in the first storage component; and
determine, based on the third hash value being different than the second hash value, that the first set of information has been modified since determination of the modification status.

21. The system of claim 13, wherein the one or more controllers is further configured to cause the system to:
generate the second hash value using the hash function and based on reading the first set of information; and
store the second hash value before reading the first content.

22. The system of claim 21, wherein the first content is read from a same set of memory cells as the first set of information.

23. A non-transitory, computer-readable medium storing code comprising instructions which, when executed by one or more processors of a system, cause the system to:
read first content from a first storage component and second content from a second storage component, the first storage component to store a first set of information that is to remain unmodified during operation of the system, and the second storage component to store a second set of information that is to remain unmodified during operation of the system;
generate, using a hash function, a first hash value from the first content read from the first storage component and from the second content read from the second storage component;
compare the first hash value with a second hash value that is generated using the hash function before generation of the first hash value, wherein the second hash value is generated from the first set of information and the second set of information based at least in part on reading the first set of information from the first storage component and on reading the second set of information from the second storage component; and
determine a modification status of the first set of information and the second set of information based on comparing the first hash value with the second hash value.

* * * * *